United States Patent [19]

McCracken

[11] Patent Number: 4,632,431
[45] Date of Patent: Dec. 30, 1986

[54] SECTIONAL ROTARY JOINT

[75] Inventor: Donald G. McCracken, Horton, Mich.

[73] Assignee: Aeroquip Corporation, Jackson, Mich.

[21] Appl. No.: 633,656

[22] Filed: Jul. 23, 1984

[51] Int. Cl.[4] .............................................. F16L 27/00
[52] U.S. Cl. ...................................... 285/13; 285/272; 285/122; 285/190; 285/276; 285/281
[58] Field of Search ................. 285/13, 122, 134, 190, 285/272, 278, 279, 280, 281, 276

[56] References Cited

U.S. PATENT DOCUMENTS

| 1,529,994 | 3/1925 | Ellis | 285/279 |
|---|---|---|---|
| 1,582,246 | 4/1926 | Buchanan | 285/13 |
| 1,923,328 | 8/1933 | Reed | 285/134 |
| 2,462,006 | 2/1949 | Schmitter et al. | 285/134 |
| 2,717,166 | 9/1955 | Hedden | 285/134 |
| 2,964,340 | 12/1960 | Kinzie et al. | 285/134 |
| 3,405,980 | 10/1968 | Stonebraker | 285/276 |
| 3,433,488 | 3/1969 | Grantom | 285/276 |
| 3,484,853 | 12/1969 | Nishi | 285/134 |
| 3,889,983 | 6/1975 | Freize et al. | 285/13 |
| 4,418,947 | 12/1983 | Talafuse | 285/276 |
| 4,555,197 | 11/1985 | Erickson | 192/67 R |
| 4,557,358 | 12/1985 | Petrak | 192/67 R |

FOREIGN PATENT DOCUMENTS

| 1256008 | 12/1967 | Fed. Rep. of Germany | 285/281 |
|---|---|---|---|
| 900512 | 7/1945 | France | 285/134 |
| 1125281 | 10/1956 | France | 285/122 |
| 518218 | 2/1940 | United Kingdom | 285/272 |
| 1191235 | 5/1970 | United Kingdom | 285/281 |

OTHER PUBLICATIONS

"Deublin Rotating Unions", Catalog, Bulletin 663.
Aeroquip A. G. "Flanged, Single Flow Type 'FP' Flanged Housing", Flyer.
Deublin Company "Big Capacity Cartridge Water Union", advertisement.

Primary Examiner—Cornelius J. Husar
Assistant Examiner—Eric K. Nicholson

[57] ABSTRACT

A rotary joint or union characterized by its ease of assembly, disassembly and maintenance wherein a mounted internal conduit supports a rotary anti-friction bearing housing to which a seal housing is removably attached by bolts. A conduit port defined in the seal housing communicates with the interior of the conduit. A bearing retainer mounted upon the end of the conduit includes a seal having a radial face engaging the radial face of a seal mounted on the seal housing in a self-aligning manner. A compression spring maintains engagement of the seal faces through a seal assembly, and the seal housing seal is mounted within a retainer loosely keyed to the seal housing to facilitate self-alignment.

1 Claim, 3 Drawing Figures

SECTIONAL ROTARY JOINT

BACKGROUND OF THE INVENTION

Rotary unions or joints are employed to interconnect rotative fluid systems with fixed conduits, i.e. in rotary driven heating or cooling systems. Such unions normally include relatively movable seals wherein wear occurs at the seal faces requiring periodic maintenance.

Known rotary unions and joints are often difficult to disassemble for maintenance, and it is a purpose of the invention to provide a rotary joint particularly characterized by its ease of assembly and maintenance and efficient sealing.

Another object of the invention is to provide a rotary union or joint employing anti-friction bearings wherein a retainer accurately positions the bearings upon an annular support conduit or sleeve, and the retainer includes a seal having a radial face whereby the retainer performs a dual purpose.

A further object of the invention is to provide an efficient, self-aligning rotary joint having vents to accommodate leakage, and wherein relatively engagable seals are positioned to resist relative rotation, but are capable of readily accommodating misalignment during rotation.

An additional object of the invention is to provide a rotary joint employing engagable annular seals wherein the seals are maintained in contact by a compression spring acting upon a seal assembly which simultaneously seals rotating seal structure to a fixed seal housing.

In the practice of the invention an annular conduit in the form of a sleeve includes a supporting flange for attachment of the joint to the rotating member, such as a heating or drying drum. Anti-friction bearings are mounted upon the sleeve within a bearing housing, and an annular bearing retainer threaded upon the end of the sleeve engages the bearings to axially position the same thereon and the retainer includes a seat for coaxially supporting an annular seal having a radial sealing face.

A seal housing is removably attached to the end of the bearing housing by bolts, and the seal housing includes at least one port for attachment of a conduit thereto in communication with the interior of the seal housing and the sleeve. An annular seal retainer is loosely supported within the seal housing upon axially extending pins, and an annular seal having a radial face is supported upon the retainer for engagement with the bearing retainer supported seal. A seal assembly biased toward the sleeve by a compression spring located within the seal housing imposes an axial force upon the seal retainer and supported seal, and simultaneously seals the retainer relative to the seal housing. This relationship is accomplished by the presence of radially extending surfaces defined on the seal assembly and the seal retainer permitting axial forces to be imposed on the seal retainer by the assembly.

Vents defined in the bearing housing in radial alignment with the relatively moving seal faces permit lost fluid to readily escape without the buildup of pressure, and the axial biasing forces imposed upon the seal assembly and seal retainer permit self-alignment of the relatively moving seal surfaces due to the loose support of the seal retainer, even though this support does not permit relative rotation with respect to the seal housing.

Apparatus constructed in accord with the invention may be economically manufactured and readily assembled, and the objects sought to be achieved by the invention are met.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENTS

Figure 1:
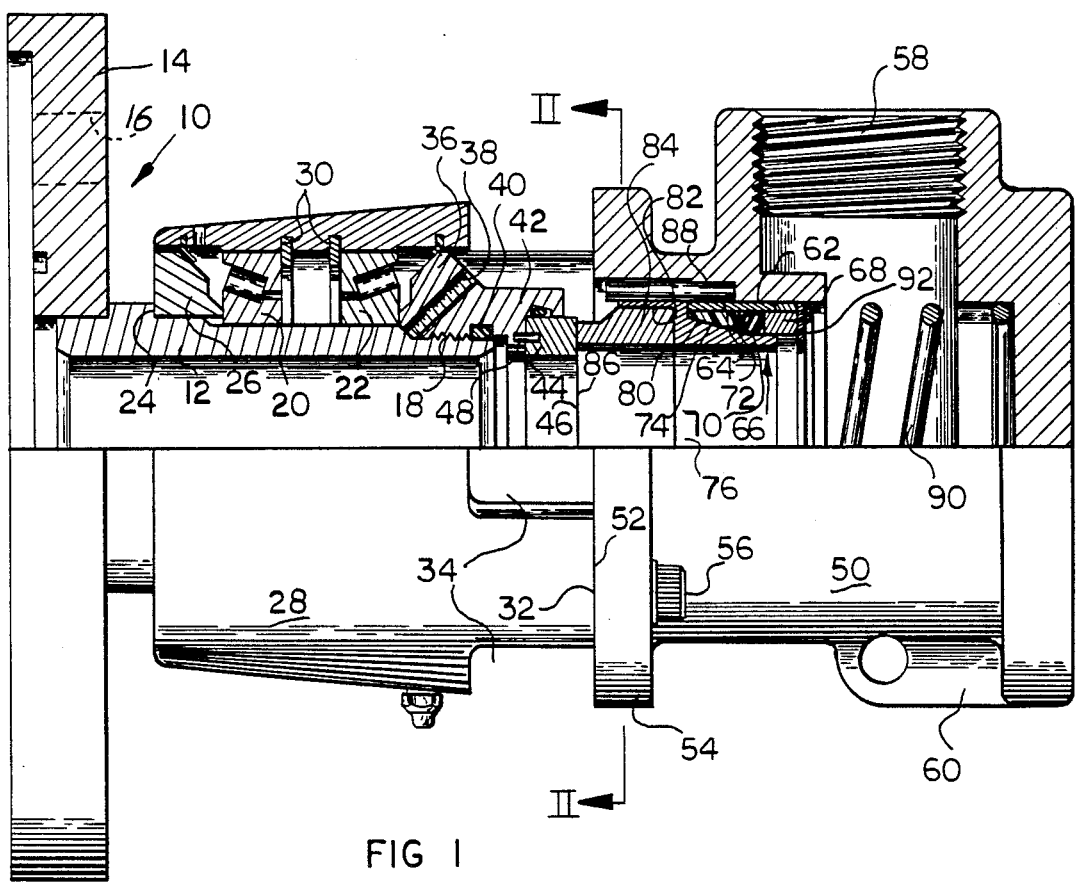
FIG. 1 is an elevational view, the upper half being sectioned, illustrating a rotary union or joint in accord with the invention.

With reference to FIG. 1, a rotary union or joint in accord with the inventive concept includes a support member generally indicated at 10 consisting of a tubular sleeve 12 having an outer end upon which an adapter plate 14 is attached. The adapter plate 14 includes bolt holes 16, and is bolted to the rotary component of the fluid system with which the joint is utilized. For instance, the adapter may be bolted to a heating or cooling drum, not shown, through which water is circulated. The joint shown in FIG. 1 is designed for hot water up to 300° F. at 150 psi.

The sleeve 12 includes an inner end upon which threads 18 are defined, and the outer cylindrical surface of the sleeve is circumscribed by a pair of anti-friction bearings 20 and 22. The sleeve includes a concentric surface and radial shoulder 24 receiving the flange ring 26 which engages the lower race of the adjacent bearing 20, and the bearings are mounted within the annular bearing housing 28, which includes positioning snap rings 30. The bearing housing 28 includes an inner radial end 32, and a plurality of large slots or ports 34 are defined in the bearing housing adjacent the end 32.

An annular bearing retainer 36 is internally threaded for engagement with the sleeve threads 18, and a set screw 38 extending through the retainer engages the sleeve to lock the retainer thereon. An O-ring 40 seals the retainer relative to the sleeve, and the retainer includes an axially extending extension 42 having an inner recess defined therein for receiving the annular seal 44.

The seal 44 may be formed of carbon, ceramic, steel, and is preferably manufactured of stainless steel, and includes a radial sealing face 46. The seal 44 is maintained in a fluid-tight relationship to the retainer 36 by an O-ring, and a pair of axially extending pins 48 lock the seal to the retainer to prevent relative rotation thereto.

The seal housing 50 includes a flat radial mounting surface 52 defined on flange 54, and a plurality of threaded bolts 56 received within threaded holes defined in the bearing housing 28 attach the seal housing in a removable manner to the bearing housing to provide open access to the bearing retainer and other structure within the bearing housing.

The seal housing includes a conduit port 58, internally threaded, for receiving a pipe whereby fluid may be introduced into, or removed from the joint, and the seal housing includes a web 60 having a hole defined therein wherein external support structure, not shown, may be mounted to the seal housing to resist rotation thereof.

Internally, the seal housing includes a cylindrical surface 62 for receiving the ring 64 which may be pressed into position. A seal assembly 66 is located within the ring 64 and includes a spacer 68, an O-ring 70 and an annular wedge type seal 72 which may be formed of Teflon or other elastomeric material. The wedge seal 72 includes an internal oblique surface 74 for cooperation with an engaging oblique surface on the seal retainer, as later described.

Figure 2:
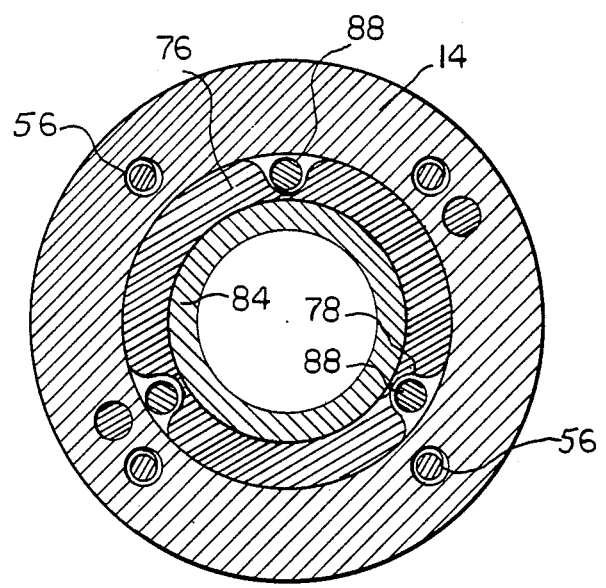
FIG. 2 is an elevational, sectional view as taken along Section II—II of FIG. 1.

An annular seal retainer 76 is located within the seal housing 50 and is of an annular form, FIG. 2, including three axially extending recesses 78 defined in the circumference thereof. The retainer 76 includes an obliquely oriented surface 80 upon which the seal assembly 66 is mounted wherein both the surface 74 and the surface 80 have a radially extending dimension whereby axial forces may be transmitted therebetween.

The retainer 76 includes a countersunk recess 82 receiving the annular seal 84, which may be formed of carbon. The seal 84 includes a radial sealing face 86 engaging the face 46 of seal 44 wherein a sealed relationship exists between the seals as relative rotation occurs therebetween.

Three pins 88 are mounted within the seal housing 50 in parallel axially extending relationship spaced at 120° intervals about the axis of the joint for loose reception within the retainer recesses 78. In this manner, the retainer 76 is keyed to the seal housing to prevent relative rotation thereto, but axial displacement between the retainer and seal housing may occur.

A compression spring 90 within the seal housing imposes an axial biasing force on the seal assembly 66 through the washer 92, and this biasing force maintains intimate engagement between the wedge seal 72 and retainer 76 radially positioning the retainer within the seal housing and assuring a fluid-tight relationship between the retainer and seal housing, and due to the oblique surfaces 76 and 80, imposes an axial force on the retainer toward the left, FIG. 1, to assure a sealed engaging relationship between the seal faces 46 and 86. As the seals 44 and 84 slowly wear, the biasing force produced by spring 90 compensates for such wear to maintain sealing, and any loss of fluid at the rotating seal faces will be vented through the ports 34.

As the seal housing 50 may be readily removed from the bearing housing 28, the interior of the joint is readily accessible for replacement of seals 44 and 84, or any other components that require attention, and as there is no axial telescoping relationship between the seal housing and bearing housing, disassembly of these components is readily achieved in view of the radial joining surfaces of both the housings, and the seals, which aids in disassembly and minimizes the relative movements required of the fixed conduit components for maintenance. The loose interrelationship between the pins 88 and seal retainer 76 assures self-alignment of the retainer and seal 84 with respect to the seal 44, and the disclosed construction produces an effective sealing relationship over an extended duration.

Figure 3:
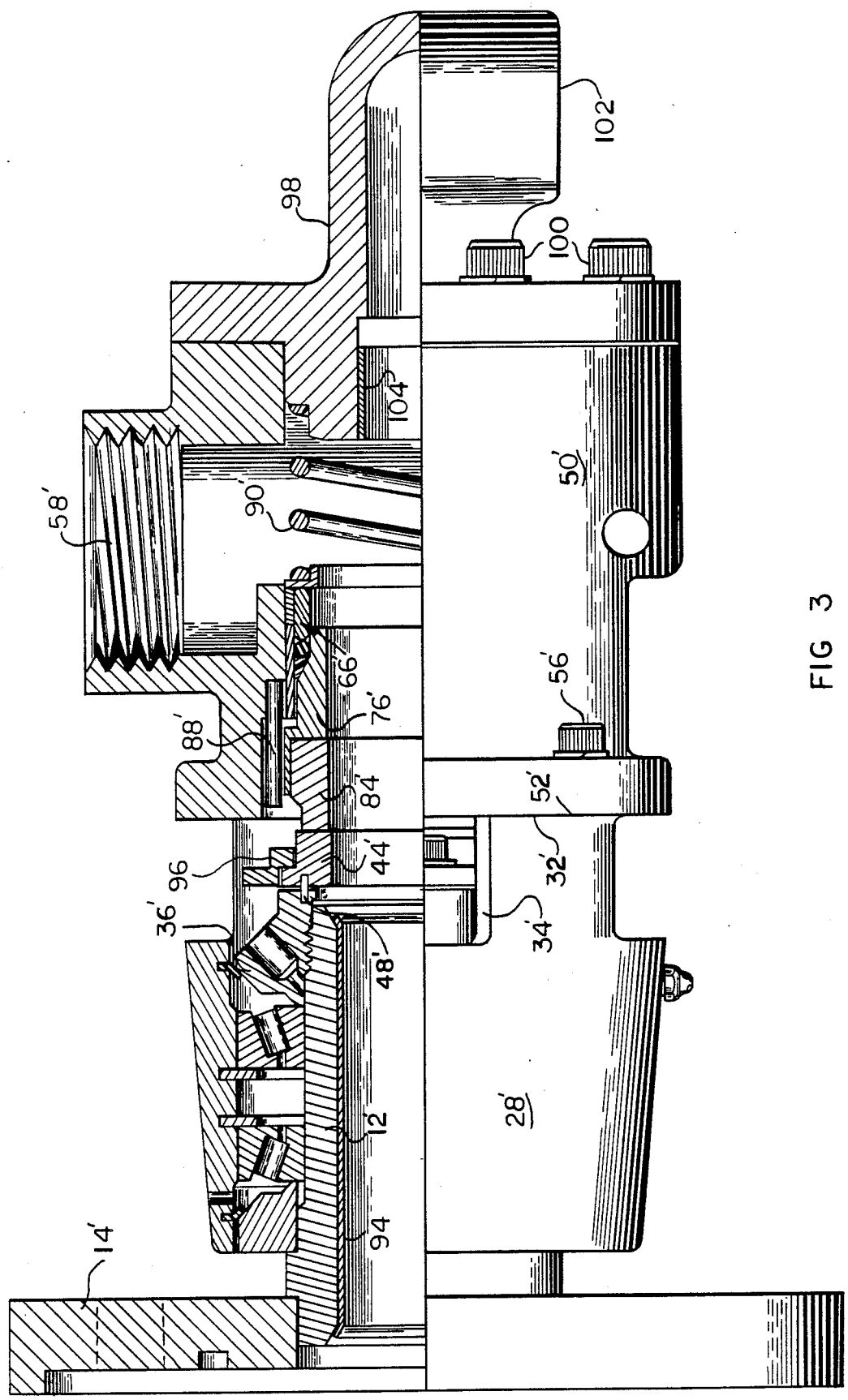
FIG. 3 is an elevational view, partially sectioned, illustrating another embodiment of rotary joint in accord with the invention.

The rotary joint or union shown in FIG. 3 is particularly designed for handling hot oil of temperatures up to 500° F., and as many of the components of this embodiment are mechanically identical or equivalent to those of the previously described embodiment, such components are indicated by similar primed reference numerals.

The joint of FIG. 3 includes an annular insulating sleeve 94 separated from the sleeve 12' by a small air space to reduce the transfer of heat to the sleeve, bearings and bearing housing 28'. Cooling fins may be defined on the bearing housing, and the adapter 14', if desired.

In this embodiment, the seat 96 is defined upon the bearing retainer 36' to position the stainless steel seal 44', and the seal 84' is preferably formed of carbon. A cavity formed in retainer 36' permits graphite to be injected to seal the threads of the sleeve 12' and retainer.

The seal housing 50' of the embodiment of FIG. 3 is shown as including an elbow type end cap 98 attached to the right end of the seal housing by bolts 100. The end cap 98 includes a port 102 internally threaded whereby a conduit, not shown, may be affixed thereto.

A bushing 104 mounted within the cap 98 may be used to receive a siphon pipe, or the like.

In the embodiment of FIG. 3, the compression spring 90' biases the seal assembly 66' to the left imposing a biasing force upon the retainer 76' and seal 84', and this embodiment will function in a manner identical to the apparatus shown in FIGS. 1 and 2. As the ring 64 is pressed into position, this ring will confine the spring 90' or 90 even when the housing 50' or 50 is removed, which simplifies assembly. When newly installed, the seal assembly 66 and 66' will extend to the right of the right end of ring 64 and 64', and bias the seal 84/84' to the left until the spring washer engages the end of ring 64/64'.

It is appreciated that various modifications to the inventive concepts may be apparent to those skilled in the art without departing from the spirit and scope of the invention.

We claim:

1. A rotary joint characterized by its ease of maintenance and self-aligning seals comprising, in combination, a supprot member including a tubular sleeve having an axis, an inner end and an outer surface, a bearing housing radially aligned with and surrounding said sleeve coaxial thereto having an inner end, anti-friction bearings within said housing engaging said sleeve outer surface, said anti-friction bearings comprising a pair of axially spaced roller bearings having tapered races, the taper angle of said bearings being in opposite axial directions to resist axial forces imposed on said bearings, a bearing retainer coaxially threadedly mounted upon said sleeve inner end having an inner end engaging said bearings and axially positioning said bearings on said sleeve regulating the compressive forces imposed on said bearings and an outer end axially extending beyond said sleeve inner end, locking means defined on said bearing retainer selectively controlling rotation of said retainer on said sleeve inner end, a first annular seal coaxially mounted upon said bearing retainer outer end and keyed thereto having a radial face, a seal housing axially aligned with said bearing housing and having an open end engaging said bearing housing inner end, a conduit port defined in said seal housing, theaded bolts mounting said seal housing upon said bearing housing inner end, an annular seal retainer axially displaceable within said seal housing and coaxial with said sleeve axis, a plurality of axially extending pins mounted in said sleeve housing radially spaced from and equally angularly spaced about said sleeve axis, a plurality of axially extending recesses defined in said seal retainer each loosely receiving a pin, a concentric annular recess defined in said seal retainer, a second annular seal mounted within said seal retainer annular recess coaxial with said first seal having a radial face engaging said first seal face in a rotative sealing relationship, said pins and associated recesses preventing rotation of said seal retainer relative to said seal housing and permitting said second seal face to align itself with said first seal face, said bearing housing inner end and seal housing open end being radial and planar and substantially aligned with the plane of the faces of said first and second seals, spring means within said seal housing axially biasing said seal retainer and said second seal toward said first seal, an annular seal assembly within said seal housing and axially movable therein sealingly interposed between said seal retainer and said seal housing, said seal assembly including an annular seal ring of synthetic plastic material haivng an inner oblique surface and an outer end, an annular oblique surface defined upon said seal retainer engaging said seal ring oblique surface, said spring means comprising a compression spring operatively interposed between said seal housing and said outer end of said annular seal ring biasing said annular seal ring toward said first seal.

* * * * *